United States Patent [19]

Belveal

[11] 4,279,842
[45] Jul. 21, 1981

[54] AIR DIFFUSER ASSEMBLY
[75] Inventor: Robert E. Belveal, New Iberia, La.
[73] Assignee: Houston Systems Manufacturing Co., Inc., Houston, Tex.
[21] Appl. No.: 169,620
[22] Filed: Jul. 17, 1980

Related U.S. Application Data
[63] Continuation-in-part of Ser. No. 60,844, Jul. 26, 1979.
[51] Int. Cl.³ .............................................. B01F 5/06
[52] U.S. Cl. .................................... 261/124; 210/220
[58] Field of Search ....................... 261/122, 124, 77; 210/220

[56] References Cited
U.S. PATENT DOCUMENTS

| | | | |
|---|---|---|---|
| 3,424,443 | 1/1969 | Thayer | 210/220 |
| 3,490,700 | 1/1970 | Kern | 261/124 |
| 3,608,834 | 9/1971 | MacLaren | 261/124 |
| 3,975,276 | 8/1976 | Schmid | 210/220 |
| 4,051,204 | 9/1977 | Muller | 261/124 |

Primary Examiner—Ernest G. Therkorn
Attorney, Agent, or Firm—Keaty & Garvey

[57] ABSTRACT

The apparatus of the present invention would relate to an air diffuser assembly which would comprise an aerator body having a plurality of side walls connected to form an enclosure and at least a pair of intersecting angularly oriented side walls forming an air container envelope for retaining an air volume therewithin. It would also have an air inlet adapted to convey air into said air body at the air container envelope, and a plurality of tear-shaped openings being provided in the body below the air container envelope allowing air to discharge air from the body through the tear-shaped openings, with each of the tear-shaped openings providing an upper pointed portion which would minimize the bubble size of air discharged through the openings. The apparatus would also comprise a baffle plate mounted within the enclosure at the air inlet, the baffle plate preventing the short circuit travel of air received by said enclosure to the tear-shaped openings placed on the body adjacent the air inlet. There would also be included an attachment means associated with the air inlet for attaching the aerator body to an air conveying conduit.

9 Claims, 3 Drawing Figures

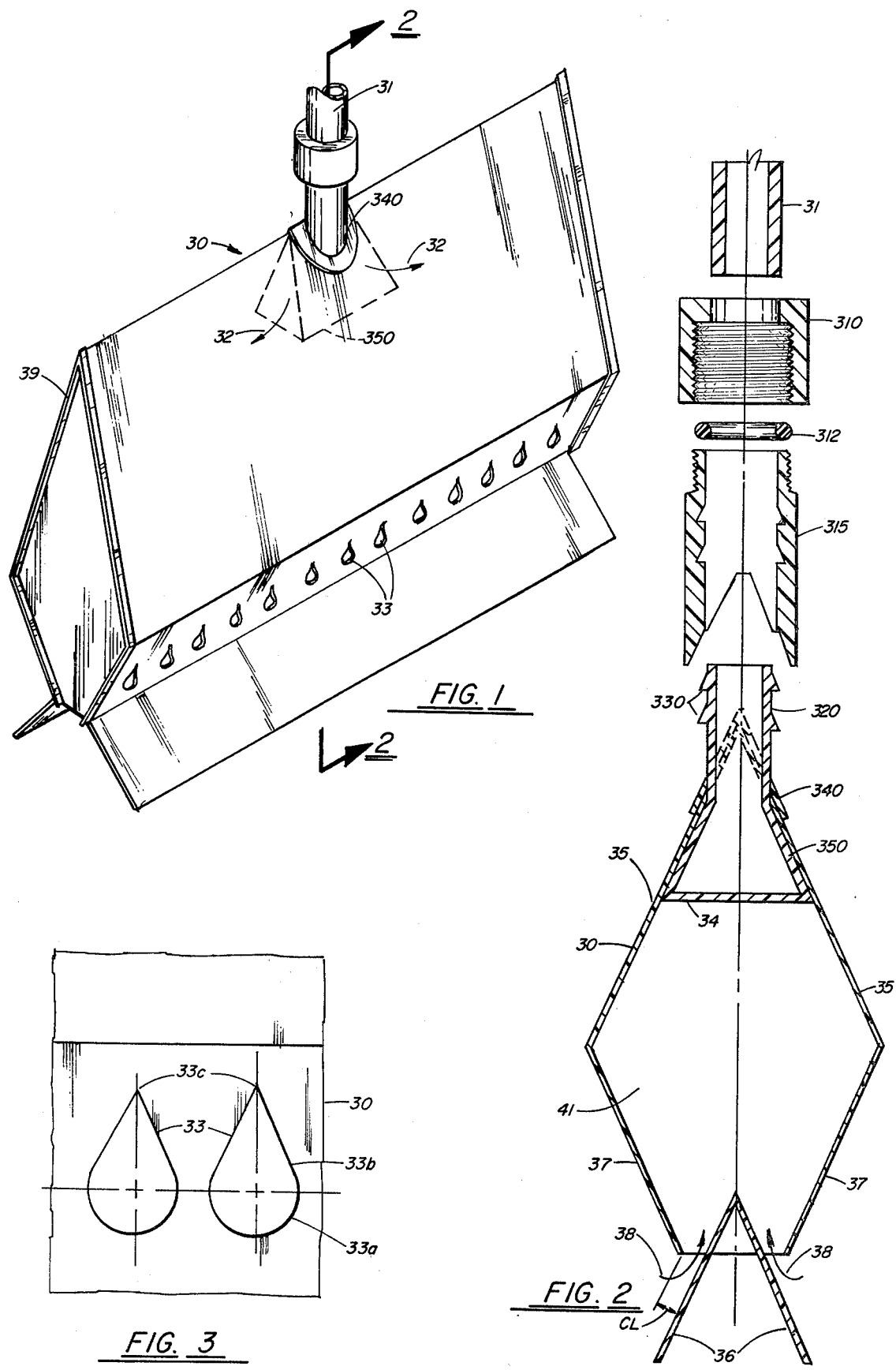

AIR DIFFUSER ASSEMBLY

This application is a continuation-in-part of my co-pending allowed application entitled "Waste Treatment Apparatus", filed on July 26, 1979, and bearing Ser. No. 060,844.

BACKGROUND OF THE INVENTION

1. Field of the Invention

The present invention relates to waste treatment systems and especially those waste treatment systems which are packaged or containerized units. Even more particularly, the present invention relates to an air diffuser apparatus in which an air inlet would be provided to convey air into an air container envelope within an aerator body and further allowing air to discharge from the body through tear-shaped openings, and allowing solid particles to be discharged through discharge means on the lower portion of the aerator body.

2. General Background and Prior Art

In the treatment of waste, there is often utilized a containerized or packaged unit treatment plant which treats received waste product on a continuous basis. In the marine industry, for example, there is utilized a package sewage treatment plant which can be used on ships, oil rigs, and like installations. Such sewage treatment devices usually receive flow intermittantly and must treat the flow in order to meet ecological and other marine standards. It is desirable that waste be treated such as sewage in an economical way utilizing as little energy as possible and as few moving parts as possible. Note also it is desirable that a minimum of sludge removal would be required since the sludge disposal presents an extra problem. Further, the accumulation of sludge within the unit would produce an undesirable possibly corrosive attack on the unit itself. An accumulation of sludge within the unit further results in a deterioration of the treatment process.

It would be desirable that a sludge treatment apparatus produce a total homogenation of the fluids received from the waste stream in order that they be properly bio-degraded. Waste entering the unit would normally be heterogeneous in nature, containing solid waste material as well as some liquid material. A breakup of this material is necessary in order that it be treated properly.

In aerated treatment systems, a problem is faced in that a clogging of the aeration assembly which provides bubbles to the unit will cause a degeneration of the treatment process or in fact a total stoppage of air flow to the vessel, transferring the process from aerobic thus removing any treatment capability. It would be desirable that the aeration unit or air diffuser be of a nature which would reduce or prevent clogging by solid material which may enter the unit.

3. General Discussion of the Present Invention

The present invention would solve prior art problems and shortcomings by providing a waste treatment apparatus having no moving parts in a basic hydraulic system which would consist of an air diffuser assembly having an aerator body with a plurality of side walls connected to form an enclosure and at least a pair of intersecting angularly oriented side walls, forming an air container envelope for retaining an air volume there within. There would also be adapted an air inlet which would convey air into said air body at the air container envelope, and a plurality of tear-shaped openings being provided in the body below the air container envelope for allowing air to discharge from the body through tear-shaped openings, with each of the tear-shaped openings providing an upper pointed portion which would minimize the bubble-size of air discharged through the openings. Also, there would be provided a baffle plate mounted within the enclosure at the air inlet, the baffle plate would be used for preventing a short circuit travel of air received by the enclosure to the tear-shaped openings placed on the body adjacent the air inlet. There would also be included an attachment means associated with the air inlet for attaching the aerator body to an air conveying conduit.

Thus, it is an object of the present invention to provide an air diffuser assembly which produces a bubble stream having a high surface area.

It is another object of the present invention to provide an aeration diffuser adapted for disallowing the accumulation of sludge or other undesirable deposits within the diffuser assembly, and to disallow the clogging of bubble generating orifices by waste solid material.

It is still another object of the present invention to provide a waste treatment apparatus which eliminates the need for sludge removal and further sludge treatment.

It is a further object of the present invention to provide a waste treatment system which is gravity operated, utilizing no other energy dependent driving force.

It is a further object of the present invention to provide a waste treatment apparatus having distinct liquid operating levels which are maintained without the use of pumps or valves.

BRIEF DESCRIPTION OF THE DRAWINGS

For a further understanding of the nature and object of the present invention, reference should be had to the following detailed description, taken in conjunction with the accompanying drawings in which like parts are given like reference numerals and wherein:

FIG. 1 is a perspective view of the diffuser assembly of the preferred embodiment of the apparatus of the present invention;

FIG. 2 is a partial front view of the diffuser assembly of the preferred embodiment of the apparatus of the present invention;

FIG. 3 is an end sectional exploded view of the diffuser shown in FIGS. 1 and 2.

DETAILED DESCRIPTION OF THE PREFERRED EMBODIMENT

FIGS. 1-3 best show the preferred embodiment of the apparatus of the present invention designated generally by the numeral 30. In the construction of air diffusers assembly 30, each diffuser assembly 30 provides an air inflow 31 with the air flow being generally shown by the arrows 32 in FIG. 1. Each air diffuser provides a baffle 34 which prevents any short circuiting of air directly through the openings 33 immediately adjacent inflow 31. Diffusers 30 provide upper side walls 35 which intersect with lower side walls 37 which are angularly deposed with respect to one another to form a "diamond" cross sectional shaped container envelope 41 for retaining an air volume there within. Side wall 35, 37 preferably form angles with the horizontal of approximately 62 degrees. It has been found that the angle of 62 degrees prevents accumulation of any solid matter or other settlable material upon (interior or exterior) side walls 35, 37, thus keeping all solid matter in the suspension to enhance mechanical break up and thorough waste stream treatment.

A diffuser rib 36 is provided which is attached to the inwalls 39 of diffusers 30. Each diffuser 30 provides inwalls 39 to thus sealably contain air within the envelope 41 of diffuser 30 only allowing its escape through air discharge openings 33. Air discharge openings 33 are tear-dropped shaped and have a lower circular portion 33A which communicates with upper pointed portion 33B, forming together the entire tear-shaped air discharge opening 33. The uppermost elevational point of each opening 33 is indicated as the point 33C in FIG. 3. The openings 33 so provided, allow the smallest bubble size possible to escape from diffuser 30, thus providing for a fine bubble which maximizes air surface area and thus contact surface with the fluid being treated thereby enhancing the growth rate of micro-organism necessary for biological treatment. This enhancement is the result of higher oxygen dissolution rate produced by the smaller bubble/larger surface area.

In FIG. 2, there can best be seen the detailed construction of diffuser 30. At the uppermost portion of FIG. 2 there can be seen air inflow 31 which connects to compression bushing 310. Also seen is a compression ring 312 which fits in between coupling 315 and compression bushing 310. Note that bushing 310 and coupling 315 are threaded to threadably attach during operation. An opening is provided through bushing 310 through which inflow 31 will attach with the assembly being generally shown in FIG. 1. Coupling 315 connects to baffle tube 350. Baffle tube 350 provides an upper tube 320 and a lower baffle 34 section which are integrally attached. Baffle section 34 as best seen in FIG. 2 is designed to prevent short circuiting of air flow from inflow 31 to openings 33. The tube 320 portion of baffle tube 350 provides a plurality of annular projecting ribs 330 which cooperate with corresponding annular grooves in coupling 315 as best seen in FIG. 2.

A suitable gasket 340 of neoprene for example, is provided which fits between the lower portion of coupling 315 and above the upper wall 35 of diffuser 30. It would be appreciated that the parts above-described are assembled by first placing baffle tube 350 within diffuser 30 and up through an opening provided at the intersection of upper walls 35 as best seen in FIG. 2. Thereafter, gasket 340 is placed over the tube 320 proportion of baffle tube 350 and coupling 315 is pressed thereonto with the grooves of coupling 315 as seen in FIG. 2 attaching to an interlocking with the projecting ribs 330 of baffle tube 350. The connection of coupling 315 with which air inflow 31 is achieved using compression pushing 310 and compression ring 312. Ring 312 would be placed on the upper portion of coupling 315 with compression pushing 310 threadably attached thereto after inflow line 31 was placed within compression pushing 310 as illustrated in FIG. 1. A threaded engagement thereafter is made of compression pushing 310 onto coupling 315 to complete the connection.

Note from an inspection of FIG. 2 of the lower portion thereof, that arrows 38 indicate the general flow of fluids through the lower portion of diffuser 30. Diffuser rib 36 allows floater to proceed upward through the openings provided in the lower portion of diffuser 30 as shown by arrows 38. The clearance indicated by the letters CL is provided which would allow any solid material which may have entered into the air container envelope 41 of diffuser 30, and which may be large enough to clog openings 33, to settle down into the bottom portion of diffuser 30 and filter out through clearance area "CL". The diffuser rib 36 would preferably be of a sixty-two (62°) degrees angular orientation, as is the case with side walls 35, 37 as above described, which would further facilitate the movement of trapped solids down toward clearance opening "CL".

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An air diffuser assembly comprising:
   a. an aerator body comprising a plurality of side walls connected to form an enclosure, and at least a pair of intersecting angularly oriented side walls forming an air container envelope for retaining an air volume therewithin;
   b. an air inlet adapted to convey air into said air body at said air container envelope;
   c. a plurality of tear-shaped openings being provided in said body below said air container envelope allowing air to discharge from said body through said tear-shaped openings, each of said tear-shaped openings providing an upper pointed portion which minimizes bubble-size of air discharged through said openings, and a lower circular portion communicating with said upper pointed portion, forming together said tear-shaped opening.

2. The apparatus of claim 1, further comprising a baffle plate mounted within said enclosure at said air inlet, said baffle plate preventing the short circuit travel of air received by said enclosure tear-shaped openings placed on said body adjacent said air inlet.

3. The apparatus of claim 1 wherein said plurality of said side walls have an angular inclination of at least sixty-two (62°) degrees.

4. The apparatus of claim 1, wherein said tear-shaped openings each provide an upper point at the upper portion thereof, said tear-shaped opening being substantially of equal elevation, and said width said point portions being at the upper most elevational level thereof.

5. The apparatus of claim 1, further comprising attachment means associated with said air inlet for attaching said aerator body to an air conveying conduit, said attachment means comprising:
   a. an air flow conduit said conduit having a plurality of annular grooves provided on its outer surface;
   b. a connector pipe assembly providing a plurality of annular projections, corresponding to and registering during operation with said annular groove; and
   c. an opening provided in the upper portion of said aerator body, said opening allowing the passage of at least a portion of said conduit therethrough.

6. The apparatus of claim 1, wherein the diffuser assembly further comprises a diffuser means for allowing the flow of fluids into the lower portion of said aerator body.

7. The apparatus of claim 6, wherein the diffuser means further comprises a rib portion for diffusing the flow of fluids into the lower portion of said aerator body.

8. The apparatus of claim 7, wherein the diffuser means further comprises clearance openings for allowing the discharge of settled solids out of said aerator body.

9. The apparatus of claim 7, wherein the rib portion comprises side walls having an angular inclination of at least sixty-two (62°) degrees and intersecting at a top point within said aerator body.

* * * * *